Figure 1:
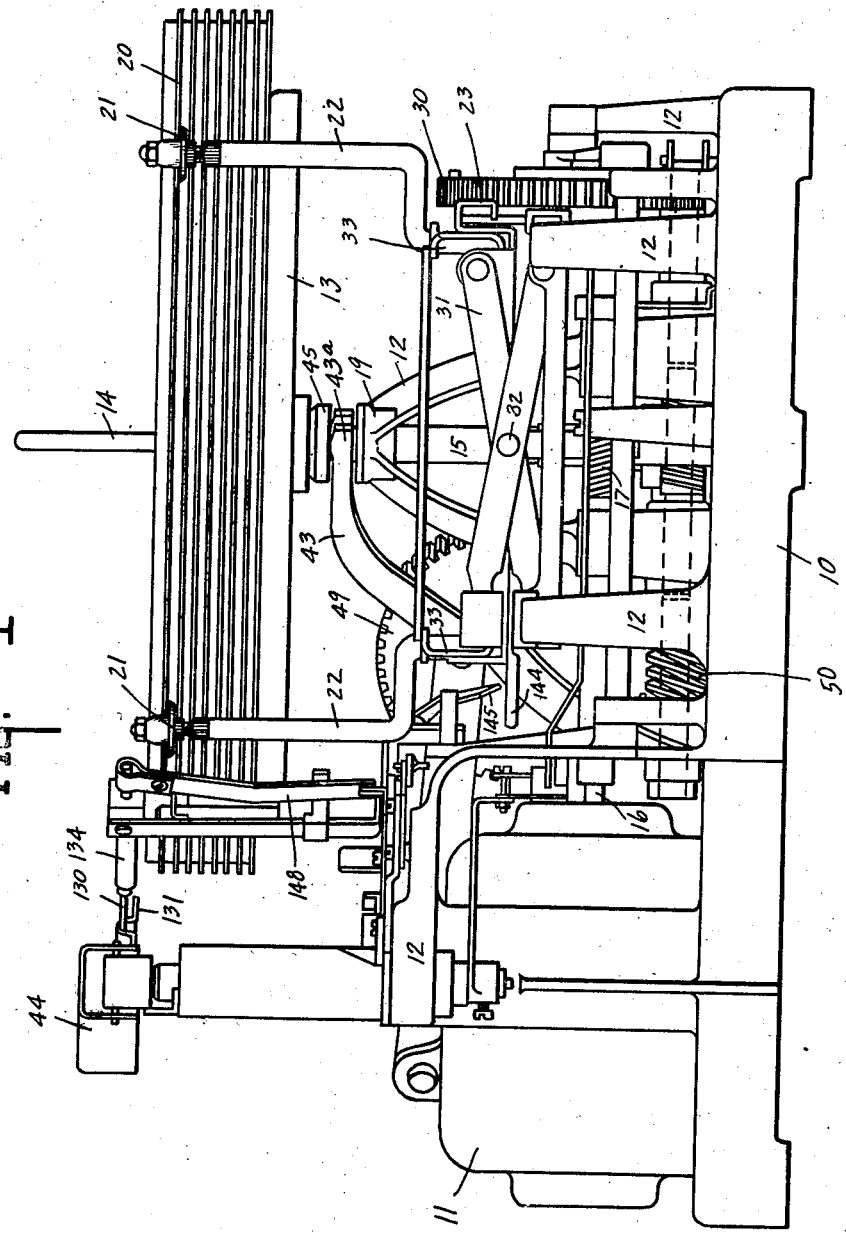

May 19, 1942.  T. M. WRIGHT  2,283,841
CLUTCH CONTROL MECHANISM
Original Filed Aug. 4, 1939  9 Sheets-Sheet 1

INVENTOR.
THEODORE M. WRIGHT.
BY
Lockwood, Goldsmith & Galt.
ATTORNEYS.

May 19, 1942.  T. M. WRIGHT  2,283,841
CLUTCH CONTROL MECHANISM
Original Filed Aug. 4, 1939    9 Sheets-Sheet 2

INVENTOR.
THEODORE M. WRIGHT.
BY
Lockwood, Goldsmith & Galt
ATTORNEYS.

May 19, 1942. T. M. WRIGHT 2,283,841
CLUTCH CONTROL MECHANISM
Original Filed Aug. 4, 1939 9 Sheets-Sheet 3

INVENTOR.
THEODORE M. WRIGHT.
BY Lockwood, Goldsmith & Galt
ATTORNEYS.

May 19, 1942.   T. M. WRIGHT   2,283,841
CLUTCH CONTROL MECHANISM
Original Filed Aug. 4, 1939   9 Sheets-Sheet 4

INVENTOR.
THEODORE M. WRIGHT.
BY
Lockwood, Goldsmith & Galt,
ATTORNEYS.

May 19, 1942.     T. M. WRIGHT     2,283,841
CLUTCH CONTROL MECHANISM
Original Filed Aug. 4, 1939     9 Sheets-Sheet 5
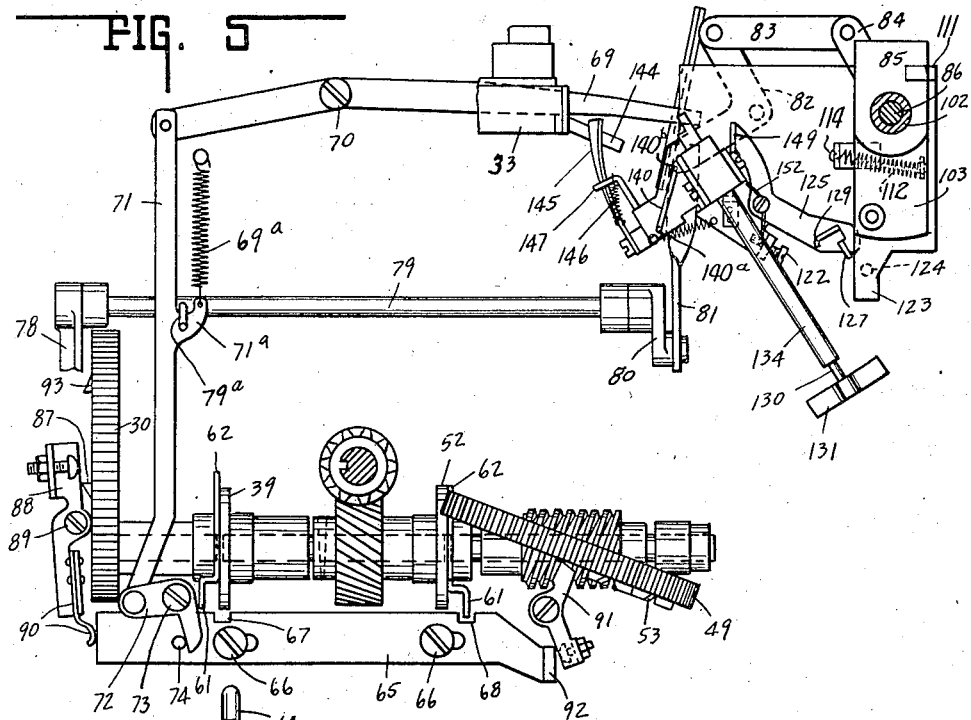
INVENTOR.
THEODORE M. WRIGHT.
BY
Lockwood, Goldsmith & Galt,
ATTORNEYS.

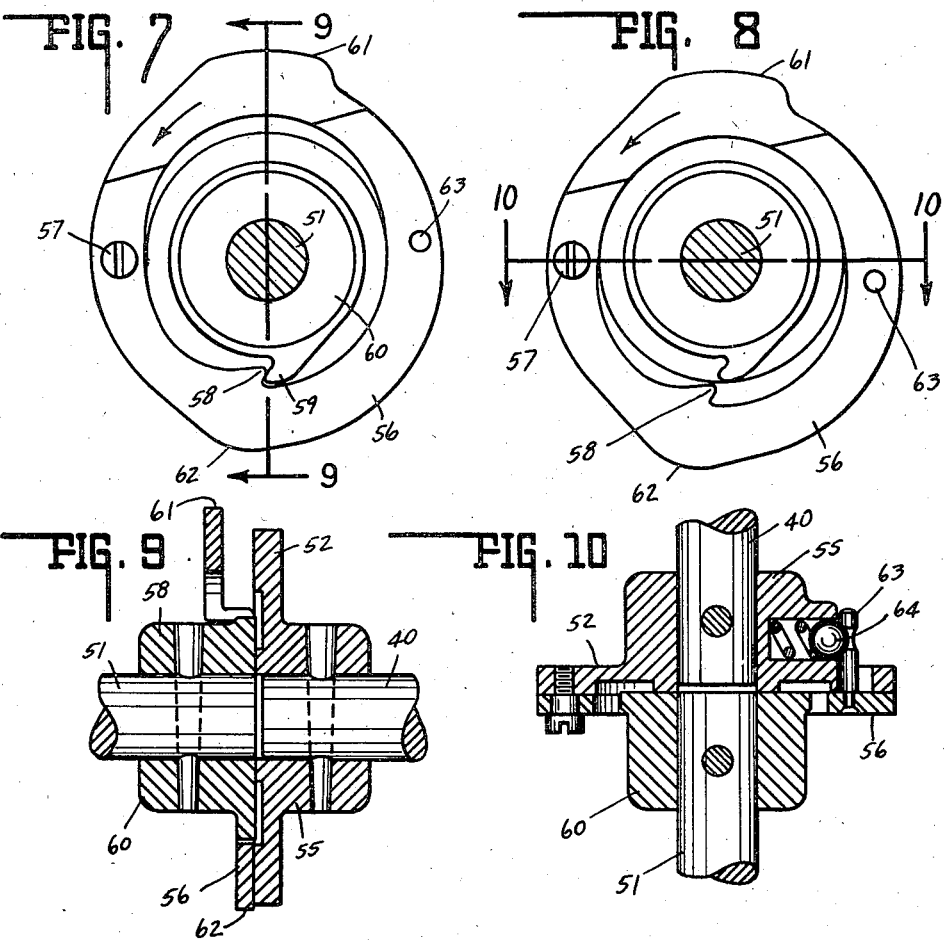

May 19, 1942. T. M. WRIGHT 2,283,841
CLUTCH CONTROL MECHANISM
Original Filed Aug. 4, 1939 9 Sheets-Sheet 7
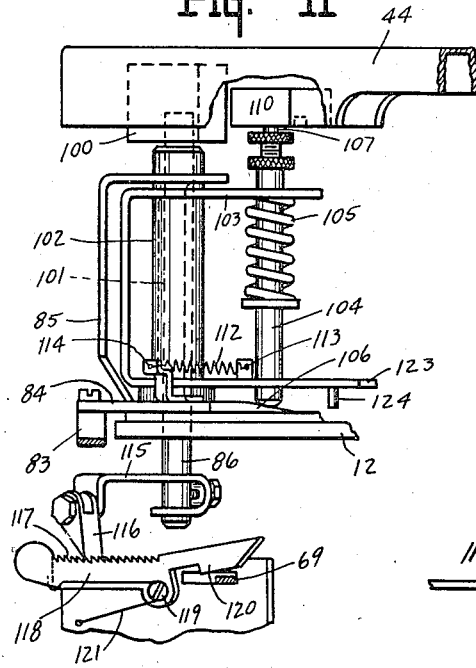
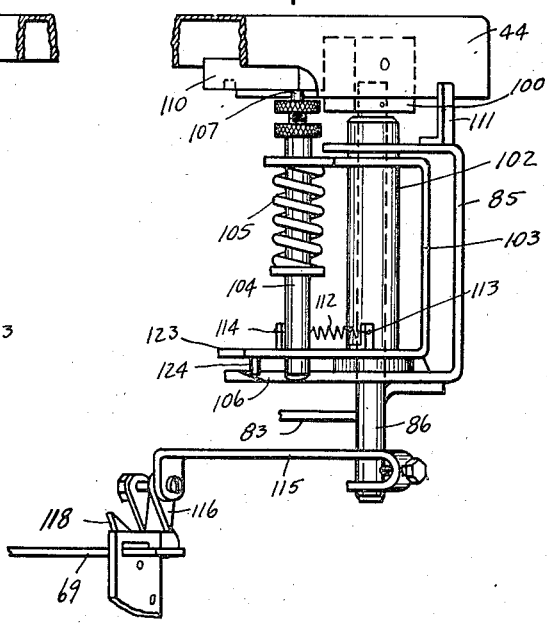
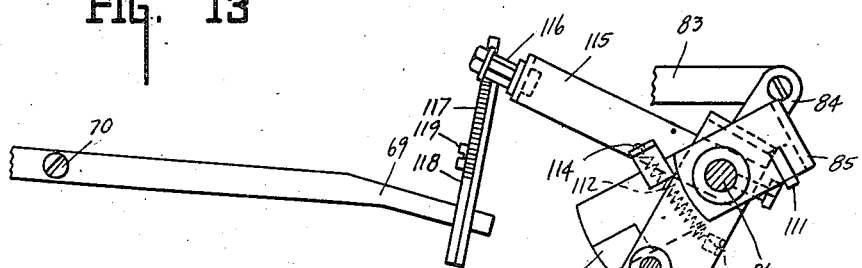
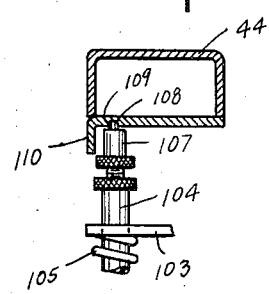
INVENTOR.
THEODORE M. WRIGHT.
BY
Lockwood Goldsmith Galt
ATTORNEYS.

May 19, 1942. T. M. WRIGHT 2,283,841
CLUTCH CONTROL MECHANISM
Original Filed Aug. 4, 1939 9 Sheets-Sheet 8
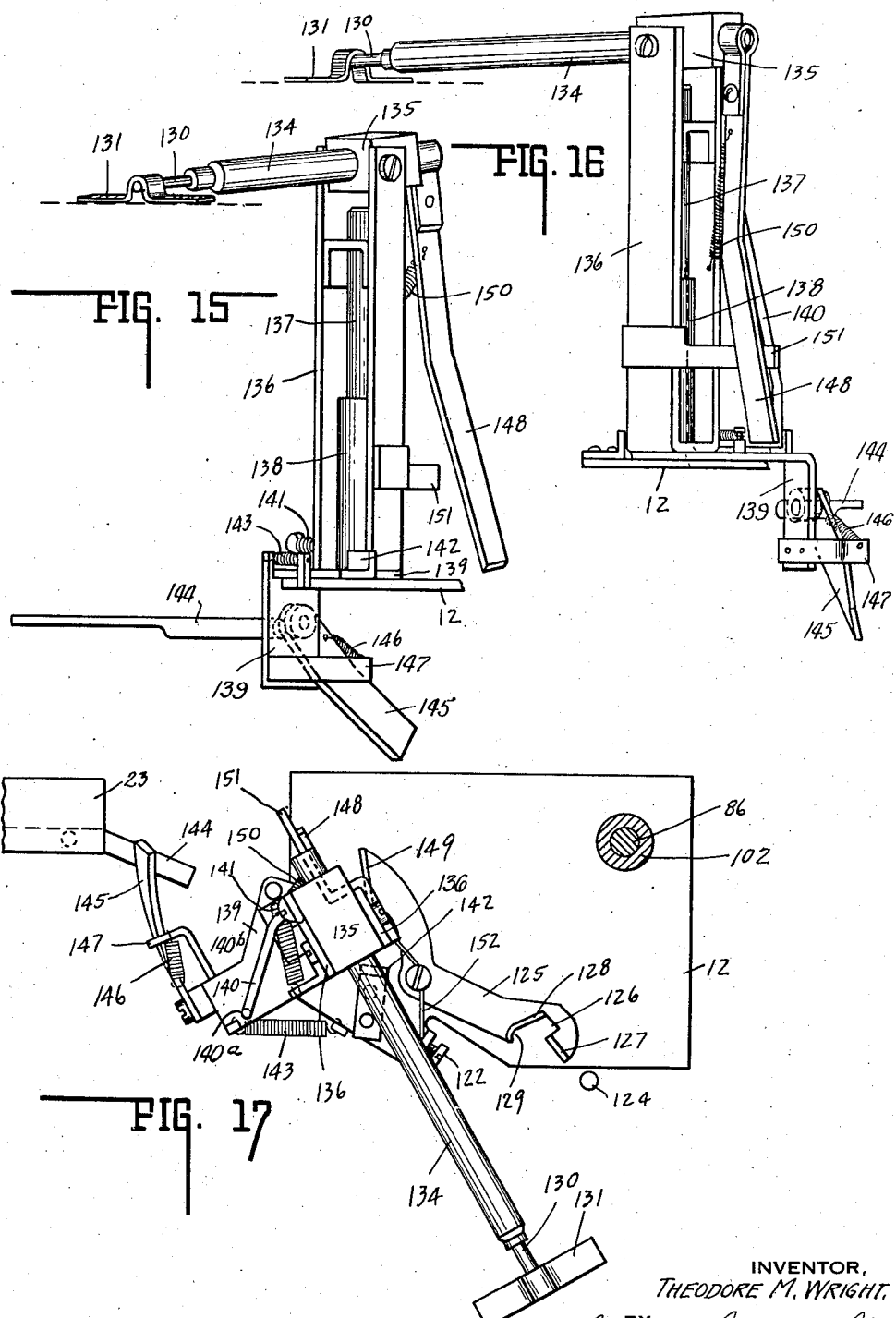
INVENTOR,
THEODORE M. WRIGHT,
BY
Lockwood Goldsmith Galt,
ATTORNEYS.

May 19, 1942.   T. M. WRIGHT   2,283,841
CLUTCH CONTROL MECHANISM
Original Filed Aug. 4, 1939    9 Sheets-Sheet 9
FIG. 18    FIG. 18-A    FIG. 18-B
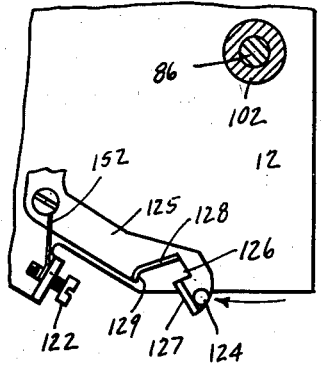
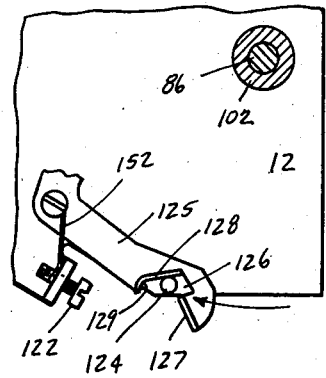
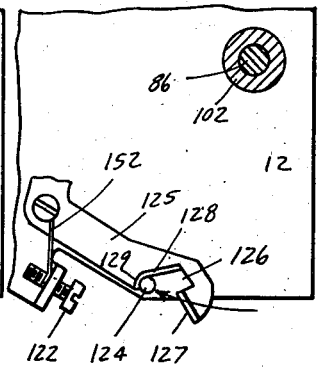
FIG. 19
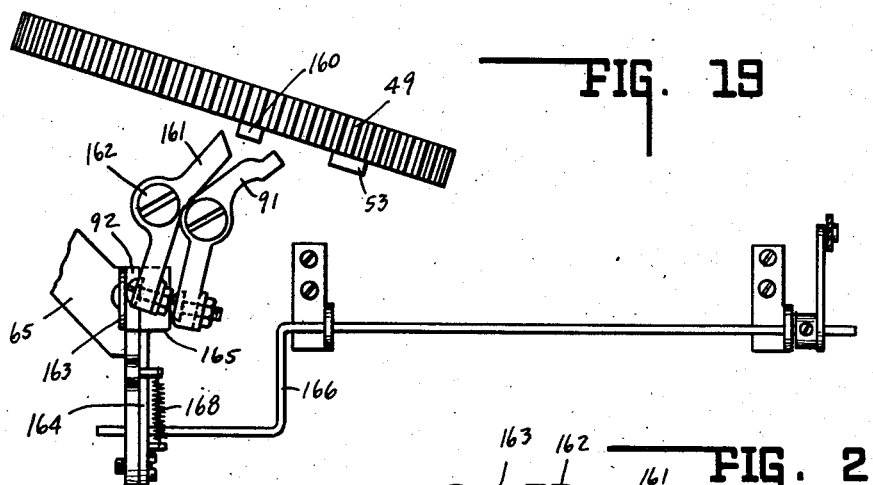
FIG. 20
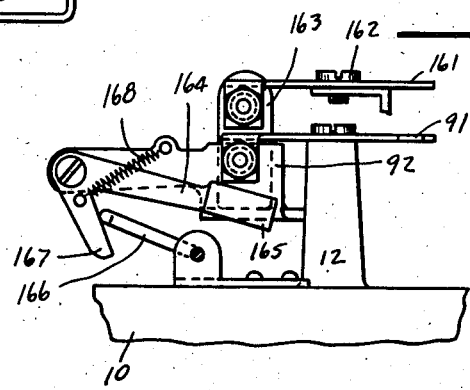
INVENTOR.
THEODORE M. WRIGHT.
BY
Lockwood, Goldsmith & Galt,
ATTORNEYS.

Patented May 19, 1942

2,283,841

UNITED STATES PATENT OFFICE 2,283,841

CLUTCH CONTROL MECHANISM

Theodore M. Wright, North Tonawanda, N. Y., assignor to The Rudolph Wurlitzer Company, Chicago, Ill., a corporation Original application August 4, 1939, Serial No. 288,336, now Patent No. 2,251,381, dated August 5, 1941. Divided and this application March 28, 1940, Serial No. 326,333

8 Claims. (Cl. 274—1)

This application is a division of application Serial No. 288,336, filed August 4, 1939 (Patent No. 2,251,381, issued August 5, 1941, for "Automatic phonograph"), and relates to a clutch control mechanism particularly applicable to moving a phonograph turntable in a step by step manner to predetermined positions in sequence to present for play a series of records stacked thereon. In this connection reference may also be had to Letters Patent No. 2,096,718, issued October 26, 1937, on an application of Otto A. Hokanson entitled "Automatic phonograph."

It is the purpose of this invention to provide a clutch control mechanism arranged to mechanically control a clutch operating to periodically move a turntable or member to a new predetermined position at the conclusion of a cyclic operation. Thus, in the present application of the clutch control mechanism, in a phonograph of the character described after completion of the playing of each record the mechanism is actuated for effecting a clutching action, causing rotation of a cam controlling the elevation of the turntable. After the cam has been thus rotated until the turntable is moved a distance equal to the thickness of the record, a projection carried by the cam actuates the control mechanism to thereupon declutch the drive. Thus, in step by step manner the turntable or any similar member is moved to predetermined positions in sequence, said positions being determined by the spacing of the projections and their relation to the cam.

Another feature of the invention resides in the clutch actuating mechanism of the double acting type controlled by a reciprocable bar which in its several positions simultaneously clutches or declutches a pair of clutch members.

Figure 2:
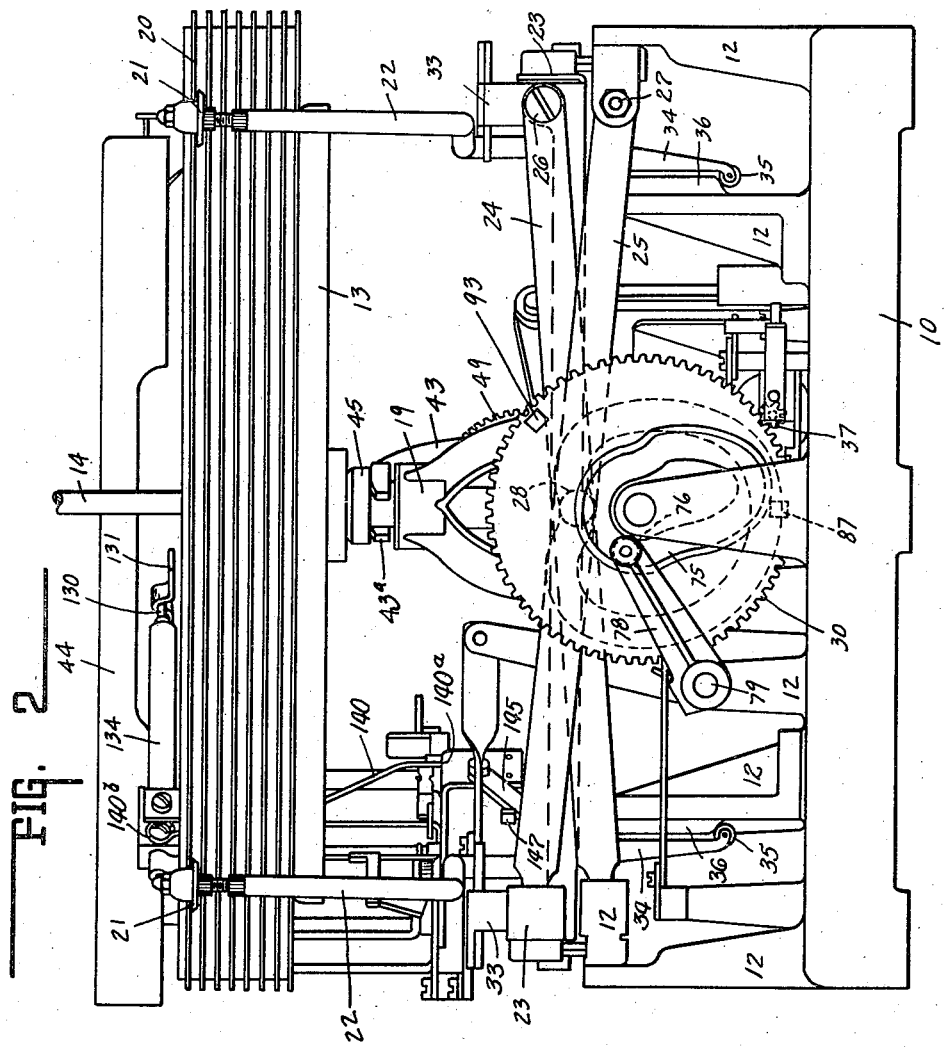
Figure 3:
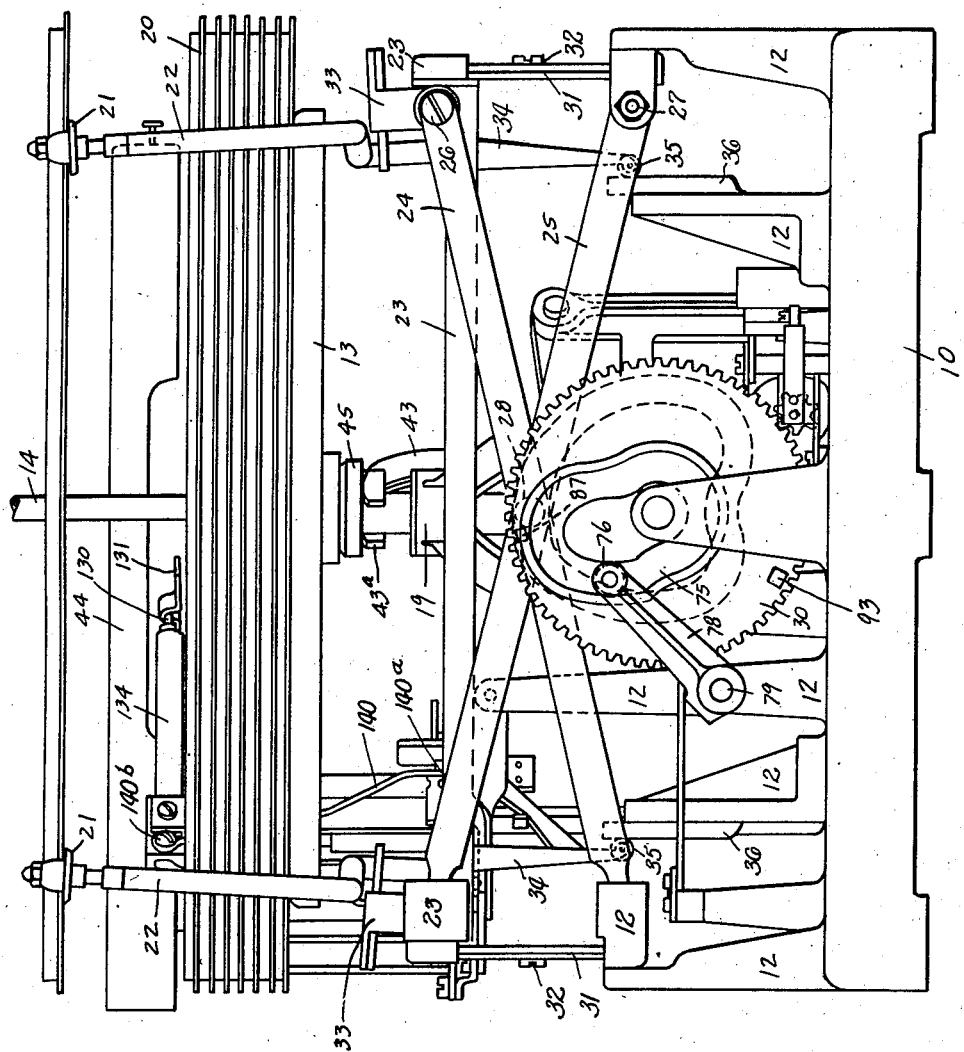
Figure 4:
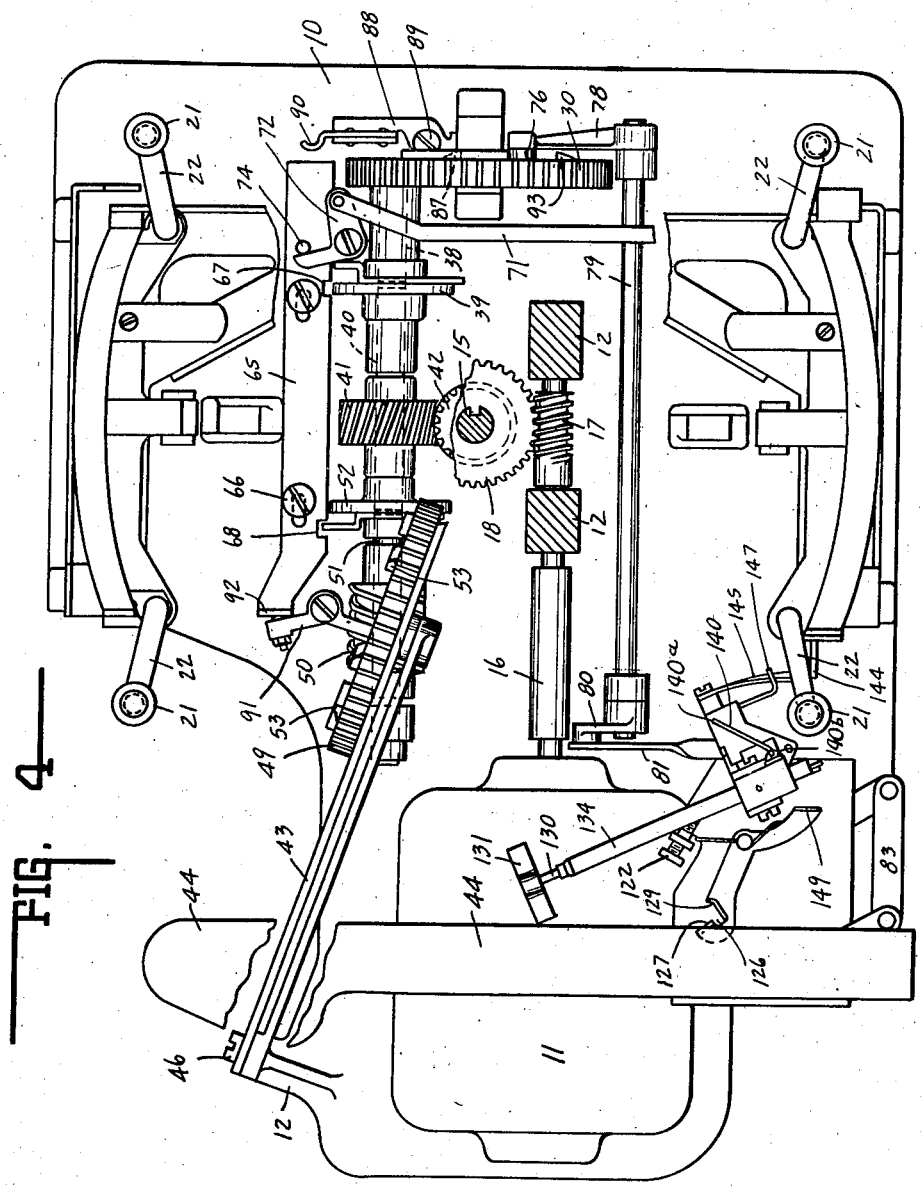

The full nature of the invention will be understood from the accompanying drawings and the following description and claims:

Fig. 1 is a rear elevation of the record changer positioned preparatory to elevating the top record to expose for play the next record therebelow. Fig. 2 is the same as Fig. 1 showing an end elevation. Fig. 3 is an end elevation as in Fig. 2, showing the topmost record elevated for playing the next succeeding record. Fig. 4 is a plan view with the turntable and turntable shaft bearing supports removed with parts in section and parts broken away, and with the turntable elevating mechanism in driving position. Fig. 5 is a plan view of a portion of the driving mechanism at the beginning of the record elevating movement. Fig. 6 is an elevation of the turntable elevating mechanism with the turntable in its lowermost position. Fig. 7 is an end elevation of one of the clutches showing the clutch members in engagement. Fig. 8 is the same as Fig. 7 showing the clutch members disengaged. Fig. 9 is a section taken on the line 9—9 of Fig. 7 with the shaft in elevation. Fig. 10 is a section taken on the line 10—10 of Fig. 8 with the shaft in elevation. Fig. 11 is a side elevation of the tone arm support and trip at completion of the play. Fig. 12 is the same as Fig. 11 showing a front elevation thereof. Fig. 13 is a plan view of the tone arm support and trip with the tone arm removed and parts positioned at the completion of play. Fig. 14 is a section taken through the tone arm and the upper portion of the tone arm elevating pin shown in elevation. Fig. 15 is a front perspective view of the record engaging feeler. Fig. 16 is a rear perspective view thereof. Fig. 17 is a plan view of the feeler and associated mechanism in inoperative position. Figures 18, 18A and 18B are illustrative of different positions of the twelve-inch record stop in respect to the movement of the tone arm arresting pin. Fig. 19 is a plan view showing a modified form of turntable control embodying a record repeating mechanism. Fig. 20 is an end view of portions of the record repeating mechanism with parts removed.

As one example of the invention, there is shown herein an automatic record changing device for phonographs comprising a base 10 carrying a motor 11 and upwardly extending frame members indicated at 12.

Mounted upon the base for rotation there is a turntable 13 from which an elongated centering pin 14 extends rotatable therewith and with the shaft 15. The shaft 15 and turntable are driven from a horizontally extending motor shaft 16 carrying a worm 17 meshing with a worm gear 18 slidably keyed to the shaft 15, said shaft being vertically supported for rotation in a bearing 19 of the frame members 12.

The records, which are supported and rotated upon the turntable in stacked relation, are carried by individual record trays 20. Said trays are all of the same diameter being sufficiently large to contain a twelve-inch record while also being capable of containing a ten-inch record.

To automatically present any one of the records contained in the stack upon the turntable for play, the tray engaging and elevating fingers 21 in the form of rotatable discs are movable to a position under the tray immediately above the record to be played. Thereupon said fingers are elevated to split the stack and elevate the superposed records and trays thereabove so as to provide overhead clearance space to permit horizontal swinging movement of the reproducer over the exposed record for reproduction thereof.

The record engaging and elevating fingers are rotatably mounted upon the several upright arms 22 spaced about the turntable and trays adjacent the periphery thereof. Said arms are supported by the movable frame members 23. Said frame members are capable of vertical movement for elevating the record trays as well as a tilting movement for throwing the fingers in and out of engagement therewith. The elevating movement of said frame members 23 is effected through the action of a set of lazy tong levers 24 and 25. Lever 24 is pivoted at one end to the frame member 23 at 26, while its other end is slidably mounted in the fixed frame member 12. Lever 25 is pivotally mounted at 27 to one of the fixed frame members 12, while its opposite end is slidably mounted in a movable frame member 23. Said levers are pivotally connected at their centers at 28 and are also provided at that point with a cam engaging roller operating in the inner cam track 29 of the cam gear 30.

The frame member 23 extends about three sides of the machine. Along the opposite end sides thereof there is provided a pair of lazy tong arms 31 which steady and guide the vertical movement of the frame 23 for maintaining it in parallel relation with the frame members 12. In this manner, as the three sided rectangular movable frame member 23 is caused to move up and down by the cam track 29, it is guided in such movement and maintained in its horizontal or parallel relation by the lazy tong arms 31. Said arms are pivoted together in their center, as indicated at 32 and at one of their ends to frames 12 and 23, respectively. Their opposite ends are slidably mounted in frames 23 and 12, respectively.

The horizontally positioned and vertically movable elevating frame 23 carries a rocking bar 33 upon which arms 22 are rigidly mounted. The rocking bars, which extend immediately above the lazy tong arms 31 adjacent opposite ends of the elevating levers 24, 25 are each provided with a downwardly extending arm 34 having a roller 35 at its lowermost end adapted to engage a cam 36 extending vertically on one of the upright frame members 12. Immediately upon said bars being elevated by levers 24 and 25, the cam 36 tilts them to throw the fingers 21 into engagement with the tray or record supported thereby to split the stack by elevating the said record.

The cam gear 30 is rotated for effecting this movement by a pinion 37 on shaft 38 driven through a clutch 39 by shaft 40, which in turn is driven by a worm gear 41 meshing with a worm 42 on motor driven shaft 15 (Fig. 4). While shaft 40 is continuously rotated with the turntable, shaft 38 and cam gear 30 are controlled by clutch 39 in the manner hereinafter described so as to be operated only during the record changing operation of the machine.

The record to be reproduced is automatically exposed for play by vertically positioning the turntable to bring the next record thereabove into horizontal alignment with the discs 21 so as to be engaged and elevated thereby. Such vertical positioning of the turntable is effected through an arm 43 having a yoke 43a upon its end embracing the shaft 15 and extending under a bearing 45 so that elevation of said arm 43 correspondingly elevates the turntable with shaft 15. Arm 43 is pivoted at 46 on frame 12 (Fig. 6), being gooseneched in shape and having a roller 47 engaging in the cam track 48 carried by the cam gear 49 which is driven by a worm 50 keyed to shaft 51 driven through a clutch 52 by shaft 40. Cam gear 49 is rotatably supported upon an extension 12a of frame 12.

Said gear is provided at spaced intervals around its periphery with projecting lugs 53 acting in the nature of stops for controlling the elevation of the turntable to present the next record for play after the reproduction of the preceding record has been completed. Thus, there is provided one such lug for each record. A record is presented for play, depending upon the elevation of the turntable, which in turn is controlled by the position of the lug corresponding to said record. The position of the lugs in turn is controlled by the clutch 52 which is thrown out for discontinuing rotation of the gear 49 upon the lug reaching the clutch throw-out position.

The clutch 52, as well as clutch 39, is best illustrated in Figs. 7 to 10, inclusive, wherein there is provided a driving member 55 to which a clutch ring 56 is pivoted at 57. Said ring carries an internal dog 58 positioned to engage and effect a driving lock with an external dog 59 of the driven clutch member 60 which is keyed to shaft 51. In the instance of clutch 39, said driven shaft is indicated at 38. Said clutch ring 56 is provided with radially projecting cams 61 and 62, and is also provided with a stud 63 disposed oppositely from its pivotal connection 57 so arranged as to be releasably engaged by a ball spring-pressed latch 64. As the clutch revolves in the direction indicated by the curved arrows, cam 62, upon encountering a clutch bar, hereinafter described, causes said ring 56 to oscillate about its pivotal connection 57 to move the dog 58 into interlocking engagement with dog 59. When cam 61 strikes said bar, the ring is oscillated in the opposite direction to release the dogs 58, 59. As each oscillation takes place, the stud 63 passes over and depresses the ball 64 which thereupon latches the ring in its actuated clutching or declutching position. Thus, when cam 62 strikes the bar, the shafts 40 and 51 are clutched together. When the cam 61 strikes the bar, they are declutched. The same applies to clutch 39 in respect to shafts 38 and 40.

For the purpose hereinafter explained, that portion of the ring bearing cam 61 is offset so as to be substantially spaced from the flange of clutch member 52, whereas the cam portion 62 of the ring lies adjacent thereto.

The clutch bar 65 is slidably mounted to span both of the clutches 39 and 52 through the medium of elongated slots into which studs 66 extend which are mounted upon one of the frame members 12. Opposite each of said clutches, in the edge of the bar adjacent thereto, there are notches 67 and 68, respectively. The bar 65 may be reciprocated to a position wherein one or the other of cams 61, 62 freely pass through a notch and the clutch remains in its engaged or disengaged position, as the case may be. Conversely, when said bar is reciprocated to such position that its edge is struck by one or the other of said cams during the rotation of the clutch or the driven clutch member, the clutch is thrown into its clutched or declutched position. However, bar 65 is so proportioned that whenever one of said cams strikes said bar, the opposite cam passes through the notch by reason of the offset arrangement of cam 81, so that the clutch remains in its set position until the bar is again shifted. Thus, with reference to Fig. 5, when the bar 65 is moved to the extreme right-hand position, the clutch 39 is disengaged while clutch 52 is engaged. When the bar is moved to the extreme left, clutch 52 is disengaged and clutch 39 is engaged. On the other hand, when bar 65 is moved to an intermediate position, both clutches are disengaged.

Said bar 65 is actuated to control the clutches 39 and 52 by the trip mechanism of the tone arm and reproducer, as will be hereinafter described.

When the reproducer reaches the end of the record, so that the tone arm is caused to oscillate or swing abruptly inwardly, through a pawl and ratchet or fixed stop, as hereinafter referred to, a lever 69 is moved by the spring 69a about its fulcrum point wherein it is pivoted at 70 to one of the frame members 12. The opposite end of the lever is pivotally connected with a link 71 which has its opposite end pivoted to the bell crank lever 72 fulcrumed at 73 to one of said frame members and having its free end in position to engage a pin 74 on the bar 65. Through this mechanism the bar is moved to the left to effect the engagement of clutch 39, whereupon cam gear 30 will be driven.

The spring 69a has one end secured to a frame member and its other end to a hook 71a on the link 71. Said hook 71a is positioned to be engaged by the pin 79a on the shaft 79. Thus, when the trip mechanism is actuated to release the free end of lever 69, the spring 69a causes the lever 72 to throw in the clutch to drive the cam 30. Thereupon, the pin 79a returns the levers 72 and 69 to normal position.

As shown in Figs. 2 and 3, cam gear 30 is provided with a second outer cam track 75 in which a roller 76 on the end of an arm 78 operates. Said arm is secured to shaft 79 which is supported for oscillation by the frame members 12. The opposite end of shaft 79 has secured thereto an arm 80 which is pivotally connected with a link 81. The opposite end of link 81 is connected with a bell crank lever 82 which, through a link 83, operates an arm 84 secured to the tone arm bracket 85 which oscillates about a post 86.

Through the last-mentioned mechanism, upon rotation of the gear 30 through clutch 39, the reproducer is elevated from the record after playing is completed and the tone arm is swung clear. Continued rotation of gear 30 lowers the record elevating fingers 21, as above described, to return the elevated records to the stack. Thereupon a lug 87 on gear 30 engages a lever 88 fulcrumed to a frame member at 89 and which has a protruding spring 90 on one end thereof positioned to engage one end of the bar 65. This action causes bar 65 to be thrown to the reverse or right-hand position (Fig. 5), declutching clutch 39 and causing engagement of clutch 52. Rotation of gear 30 is thereby discontinued while the gear 49 is rotated.

Rotation of gear 49 elevates the turntable unless the lowermost record has been reproduced, so as to bring the next record into playing position. The elevation of the turntable through the thickness of a record and its tray, is governed by the next following lug 53 on gear 49 engaging a bell crank lever 91, the opposite end of which actuates an upstanding projection 92 on bar 65. This permits gear 49 to be rotated only from one of said lugs to the next, whereupon the bar 65 is moved to the reverse position so as to declutch clutch 52 and engage clutch 39 to again rotate gear 30.

The turntable has thereupon been positioned to present the next record and further rotation of gear 30 elevates fingers 21 when brought into engagement with a record or its tray immediately above the record to be played, to provide the necessary clearance space for the reproducer. When gear 30 is moved sufficiently to effect its operation and at the same time operate shaft 79 to permit the reproducer to swing back to the beginning of the record, a slight projection 93, which is similar to projection 87, engages and operates lever 88 to move bar 65 slightly to the right until it is in its intermediate or neutral position. In this position both clutches 39 and 52 are declutched, and the record changing mechanism ceases to operate so as to permit rotation of the turntable and reproduction of the record in the usual manner until the trip mechanism again causes operation of said clutches, as above described. It is to be noted that lever 88 operates the bar 65 through the spring 90 which permits movement of said bar to the extreme right (Fig. 5) while said lever is engaged by the lug 87.

The tone arm 44 (see Figs. 11 to 14) is pivoted for vertical movement upon a block 100. The U-shaped bracket 85 is pivotally mounted to oscillate about the post 86. Said bracket 85 is supported by one of the frame members 12 and as above described is oscillated through link 83 and arm 84. Within bracket 85 there is a U-shaped bracket 103 pivotally supported by a shoulder on the sleeve 102 mounted on post 86 about which said brackets pivot. Said bracket 103 carries a tone arm elevating pin 104 extending vertically and slidably through its upper and lower arms. Said pin is yieldingly maintained in its lowermost position by a compression spring 105 and the lower end thereof is adapted to ride up and down upon a cam surface 106 formed on the lower arm of bracket 85. The upper end of pin 104 has an adjustable reduced head 107 arranged with a spring pressed projection 108 which engages in a longitudinal groove 109 provided in a flange plate 110 secured to the underside of the tone arm. Thus, when brackets 85, 103 are caused to move in one direction relative to each other, pin 104 is elevated by cam 106 to raise the tone arm and reproducer above the face of the record. When they are moved relative to each other in the opposite direction for presenting the reproducer at the beginning of the record, pin 104 slides down the cam 106 to lower the reproducer into record engagement. The projection 108 extending into groove 109 locks the tone arm against free oscillation while the reproducer is being lowered onto the record. But upon the needle engaging the record, continued lowering of the pin 104 in sliding down the cam causes projection 108 to disengage the groove 109 and allow the record groove to freely carry the tone arm inwardly.

An upstanding lug 111 is secured to the top arm of the bracket 85 in position to engage the rear portion of the tone arm 44 (Fig. 12) for swinging the tone arm outwardly from its innermost position to beyond the periphery of the record. Rotation of cam gear 30, upon completion of the playing of the record, swings bracket 85 from the position shown in Fig. 13 to the position shown in Fig. 5 through the medium of shaft 79 and link 83. During this initial swinging movement the inner bracket 103 with its pin 104 and the tone arm remain in their innermost position. The first requirement is that the reproducer be disengaged from the record by elevating the tone arm. This is accomplished by the movement of the bracket 85 carrying its cam 106 (Fig. 13) under the pin 104. Thus the tone arm is elevated. The brackets then lie in the same plane and the ulg 111 is brought into engagement with the tone arm so that continued pivotal movement of bracket 85 swings the tone arm outwardly to one side of the records together with the bracket 103. The record changing cycle then takes place, whereupon the cam gear 30, through link 83, swings the bracket 85 in the opposite direction. For also returning bracket 103 with the tone arm to the beginning of the record, there is provided a spring 112 (Fig. 13) which has one end connected with the bracket 103 at 113 and the other end thereof connected to the bracket 85 at 114. Thus as the bracket 85 is caused to swing back to its normal position by link 83, it swings bracket 103 and the tone arm with it through the tension of spring 112. This permits bracket 85 to be swung to its innermost position by the cam gear, while bracket 103 is stopped with the reproducer over the beginning of the record by the adjustable stops to be hereinafter described. Since the bracket 85 is swung to its innermost position and the tone arm bracket 103 is stopped intermediate this movement, the spring 112 thereby becomes expanded as shown in Fig. 13.

For removing the reproducer from the record after reproduction, shaft 86 has secured to the lower end thereof an arm 115 which carries a pawl 116 freely riding in engagement with the ratchet teeth 117 provided on lever 118. The other side of the lever is provided with a latch 120 positioned to engage or disengage the trip lever 69. Said lever 118 is provided with a spring 121 for normally maintaining it in latching engagement until moved to unlatching engagement by the pawl 116, as is well understood in the art.

For positioning the reproducer at the beginning of a record of either ten or twelve inch size, adjustable stops are provided, as hereinafter described, which arrest its inward swinging movement when bracket 103 is swung inwardly by bracket 85 through the spring 112. For this purpose there is provided a ten-inch record stop 122 (Figs. 4 and 5) against which a projection 123 on the end of the inner bracket 103 engages to arrest its inward movement and position the reproducer over the beginning of the ten-inch record groove.

To position the reproducer over the groove of a twelve-inch record, the projection 123 has provided thereon a downwardly extending pin 124 which normally clears the end of a bell crank lever 125 so as to allow said projection to engage and be arrested by stop 122. But when bell crank lever 125 is swung into operative position, pin 124 passes through an opening 126 between the upturned guide flanges 127 and 128. Flange 128 has a curved portion which serves as a stop 129 for the pin 124 to position the reproducer over the beginning of the twelve-inch record.

Bell crank lever 125 is actuated by a feeler angularly arranged so that when the feeler engages a ten-inch record, it does not affect said lever which remains inoperative, whereby the projection 123 engages stop 122. But when the feeler engages a twelve-inch record, it is leveled off to swing the bell crank lever into operative position so that pin 124 engages stop 129.

The feeler comprises an oscillating rod 130 carrying on its forward end a cross bar 131. Said bar is normally carried at an angle and is arranged to engage the exposed surfaces of the records. Thus, it will span the peripheral edge of a ten-inch record when exposed for play and remain in its normal angular position with one end dropped down beyond the edge thereof. On the other hand, when a twelve-inch record is exposed for play, it will engage the surface thereof and be brought to horizontal alignment with the horizontal surface of said record. This arrangement is such that when the feeler engages a smaller size record its tilted position will remain unchanged. But when a larger size record is engaged, its initial tilted position will be changed to a horizontal position, thereby oscillating rod 130. Such oscillation acts to throw the bell crank lever 125 into operative position to cause pin 124 to engage stop 129.

Rod 130 extends through and is carried by a tubular arm 134 having its opposite end secured to a block 135 pivoted for vertical movement between a pair of standards 136 which are swivelly mounted about a post 137 extending upwardly from the frame member 12. Surrounding the lower end of said post there is a sleeve 138 secured to a plate 139 rotatable and slidable upon the horizontal plate of the frame member 12 to which a substantially vertically extending spring rod 140 is connected at its lower end at 140a, its upper end being connected with the block 135 at 140b (see Figs. 2, 3, 4 and 5). Said plate is yieldingly connected with the standards 136 by a coil spring 141. This arrangement is such that swinging movement of plate 139 swings the feeler 131 laterally therewith under tension of spring 141. Continued movement of the plate after it has swung the feeler until it is arrested by a stop 142, causes the spring rod 140 to push up the block 135 and yieldingly force the feeler 131 downwardly into pressing engagement with the surface of the record for actuating it. The coil spring 143 is connected to the frame member 12 at one end and to the swinging plate 139 at the other end for normally returning the plate and feeler to inoperative position free and clear of the records when not actuated.

For actuating the feeler, frame 23 carrying the record elevating fingers 21 on the rocking bars 33, is provided with an extension bar 144 (Figs. 1, 5 and 15 to 17). Said bar 144 is raised and lowered with the elevation and lowering of the records and is positioned to engage the underside of a finger 145 pivoted upon the downwardly extending portion of the plate 139. Said finger is arranged to slope downwardly from its pivotal support and normally extend over the bar 144 as shown in Fig. 1. Rigidly secured to the plate 139 there is a rigid stop member 147 under which said finger extends for limiting its upward pivotal movement and at all times maintain its downwardly sloping position. The spring 146 has one end secured to the stop member and the other end to said finger as shown in Fig. 16 so as to normally maintain the finger against the stop member but permit it to be swung downwardly away therefrom under spring tension.

This arrangement is such that when the records are elevated to expose the record to be played and provide overhead clearance therefor, the feeler is swung inwardly over said record prior to the reproducer being swung inwardly to the beginning thereof. This is accomplished by the upward movement of bar 144 engaging under the sloping finger 145 so that as said bar moves upwardly the finger slides thereover to swing the feeler in a clockwise direction as shown in Fig. 17 against the tension of spring 143. Continued upward movement of the bar 144 causes the feeler to swing sufficiently far for said bar to slip off the pivoted end of the finger, thereby freeing it and permitting spring 143 to return the feeler to the position shown in Fig. 17 free of the record so that it may then be reproduced. In the meantime the feeler has performed its function, as hereinbefore described, of setting the stop member 127 for arresting the reproducer in event a twelve-inch record is to be played.

After the record is played and as the superimposed records are lowered by the frame 23, bar 144 moves downwardly, engaging the upper edge of finger 145, forcing it downwardly against the tension of spring 146 until said bar slides off the free end of said finger, whereupon spring 146 will raise the finger into engagement with member 147 in which position said finger will again extend above the bar 144 ready for the next operation.

It may be noted that since the bar 144 is rigidly mounted, and there must be some give between it and finger 145, said finger will be forced to move across the bar, resulting in the swinging movement of the feeler.

The rod 130 of the feeler carries on its opposite end a downwardly-extending oscillatory finger bar 148 having its free end positioned to engage a projection 149 on the bell crank lever 125 carrying the twelve-inch record stop 129. Said bar being rigid with the rod 130, is normally retained under tension of spring 150 against a fixed stop 151 secured to one of the uprights 136. Said stop fixes the normally angular position of the feeler bar 131 when it is brought into engagement with the record. If this position, however, is changed to a horizontal position by the size of the record, such as a twelve-inch record, then rod 130 is oscillated, causing bar 148 to swing outwardly until its free end engages the projection 149 on bell crank lever 135 for swinging it against the tension of spring 152 and into position for stopping the inward movement of the tone arm for a twelve-inch record.

From the foregoing, it will be observed that the feeler is swung by bar 144 over the exposed record to be reproduced. Thereupon spring rod 140 yieldingly forces the feeler bar 131 onto the record. The normal position of said bar is at a slight angle, such as would be effected by the inner end engaging the exposed ten-inch record while the outer end may engage its supporting tray or a twelve-inch record therebelow, or, in case of no twelve-inch record, hang free. At this angled position, the bar 148 hangs straight down and is inoperative. The bell crank lever 125 and stop 129, therefore, remain in their inoperative position so that the tone arm swings inwardly until its pin 124 abuts the ten-inch record stop 122, as shown in Fig. 17.

On the other hand, wherein a twelve-inch record is presented for play, the entire length of the bar is drawn down against the upper surface thereof so as to be moved to a truly horizontal position from its normally angular position. This slight movement oscillates rod 130 to swing bar 148 laterally into engagement with bell crank lever 125 to move guide flange 127 thereof into the path of the depending pin 124 of the tone arm (Fig. 18), guiding the pin into the opening 126 (Fig. 18A), and permitting its inward movement to be arrested by stop 129 (Fig. 18B) which thereby positions the reproducer for a twelve-inch record. The operation of the feeler occurs just prior to the inward swinging of the tone arm so that the proper setting thereof is effected at the time. The feeler is swung clear of the record before the reproducer approaches it by reason of the actuating extension bar 144 sliding over the inner end of lever 145 to free it and permit springs 143 and 141 to swing the feeler clear of the record and out of the way of the reproducer.

The general operation of the machine may be described as follows: A stack of records is placed on the turntable which is initially in its lowermost position, with the top record of the stack exposed for engagement by the reproducer. Initially, clutch 39 is in engagement and clutch 52 in disengagement. Upon starting the motor, the turntable will revolve and clutch 39 will drive the cam gear 30. This will cause the record elevating fingers to move inwardly and upwardly, but without a record being engaged thereby. As they are moving up, the feeler is moved inwardly over the peripheral edge of the top record and be brought to bear thereon for determining which tone arm stop is to be effective, depending upon the size of the record. The feeler is promptly returned to its normal position beyond the periphery of the records immediately after its operative movement, following which the tone arm is permitted to swing inwardly to position the reproducer at the beginning of the record through gear 30 and arm 78. At this point lug 93 on said gear wheel causes both clutches 39 and 52 to be thrown into declutched or neutral position, permitting rotation of the turntable while the record is being played.

Upon completion of the playing of the record the trip latch 120 is actuated to slide clutch bar 65 for throwing clutch 39 into engagement to again rotate the gear wheel 30, which raises the reproducer and swings it clear of the records through arm 78. The lazy tong levers 24, 25 are then actuated by said gear wheel to cause the record elevating fingers to be lowered to their initial position.

At this point, lug 87 on gear 30 causes movement of bar 65 in the opposite direction to declutch the clutch 39 and engage clutch 52 so that gear 30 stops while gear 49 starts to rotate for raising the turntable the thickness of one record or its tray. The elevation of the turntable is limited to the thickness of one record by the spacing of lugs 53 on gear 49 which operate to throw the clutch bar 65 in the opposite direction at this point to declutch the clutch 52, arresting further elevation of the turntable and causing gear 30 to rotate. From this point on, the above described sequence of operations follows, namely, the engagement and elevation of the played record or its tray by the elevating fingers in a manner to split the stack and provide overhead space for the reproducer. As said played record is thereby elevated, the feeler is brought into action to determine the positioning of the reproducer for a ten- or twelve-inch record, followed by the inward swinging and positioning of the reproducer at the beginning of the record and the throwing of the clutches into neutral position.

When the bottom record has been played, the spacing of the lugs 53 on gear 49 is such that the turntable, then at its maximum elevation, will be lowered to its lowermost position so as to again present the top record. This is effected through the character of the cam groove 48 on said gear.

If it is desired to manually play a single record or repeat a given record, this may be effected through any pre-selected record position, for example, the bottom record as herein illustrated. Thus, all records above the bottom record may be removed if desired and the machine will go through its complete cycle of movement, so as to always play the bottom record. For this purpose there is provided a lug 160 on the gear wheel 149 in position to engage a bell crank lever 161 pivoted to a frame member 12 at 162, as shown in Figs. 19 and 20. Said bell crank has its opposite end in position to engage an auxiliary projection 163 on the upwardly projecting end of clutch bar 65. Pivoted to an outward extension of the upstanding end 92 of said clutch bar, there is a bell crank lever 164 having a block 165 positioned to swing in and out of a space between the operative head 95 of bell crank 91 and the upstanding end 92 of bar 65. The arrangement is such that when the portion 165 of bell crank 164 is in its uppermost position, it fills the space so that bell crank 91 may operate bar 65. But when it is lowered, there is no operative engagement between said bell crank and clutch bar. Thus, as lugs 53 actuate the bell crank 91, it is ineffective so far as clutch bar 95 is concerned, unless the spacing block 165 is in its uppermost position. When it is lowered, the lugs 53 are ineffective and the gear wheel 49 must make one complete revolution, such as raising and lowering the turntable to initial position after each play to return the lowermost record to playing position for repeating it. This is accomplished through the single projection 160 which is the only remaining means of actuating clutch bar 65 through bell crank 161 and auxiliary projection 163.

The position of the spacing block 165 is controlled by a crank rod 166 operating upon a depending end 167 of the bell crank against the tension of spring 168. Said crank rod is carried to a position external of the machine for manual manipulation to throw the spacing block 165 in and out of operative position.

Thus, by manual manipulation of crank rod 166, the machine may be said to always repeat the lowermost record, or for manual playing, to render ineffectual the progressive selection of the uppermost records.

As above described, the particular example of machine herein referred to is designed to continuously play a group of records in sequence, and also permit automatic operation of a single or manually placed record. However, the invention applies equally to a machine which will automatically select and play records out of sequence, as more specifically set forth and described in the first-mentioned Letters Patent.

The invention claimed is:

1. In a clutch control mechanism for moving a rotatable member axially in step by step manner, a cam, an arm supporting said member and movable by said cam, a driving means, a clutch structure operable to connect and disconnect said driving means from said cam, and a series of elements carried by said cam positioned thereon in spaced relation corresponding to the distance it is desired to progressively move said member, said elements successively engaging and actuating said clutch structure to disconnect said driving means and thereby arrest said cam upon the member reaching a position corresponding to the position of the actuating element.

2. In a clutch control mechanism, a vertically adjustable member movable to different elevations, driving means operably connected with said member for rotating the same, a countershaft, a clutch operable to connect and disconnect said countershaft with said driving means, a cam driven by said countershaft, mechanism controlled by said cam operably associated with said member for raising and lowering the same in a step by step manner to predetermined positions corresponding to the rotation of said cam, mechanism arranged to actuate said clutch, and a series of elements carried by said cam, each corresponding to one of said predetermined positions of said member and progressively movable by said cam into engagement with said clutch actuating mechanism to disconnect said countershaft and thereby arrest said cam upon said member being moved to a position corresponding to the effective element.

3. In a clutch control mechanism for moving a rotatable member axially in a step by step manner, a cam, a source of power operably connected with said cam for driving the same, a series of elements mounted on said cam in spaced relation corresponding to each step by step position to which said member is to be moved, and mechanism engageable by said elements respectively and operable thereby to mechanically disconnect said cam from said source of power to arrest its movement at a predetermined position corresponding to the relative position of said element on said cam.

4. In a clutch control mechanism for moving a rotatable member axially in a step by step manner, a cam, a series of projections spaced about said cam, each projection corresponding to a predetermined position to which said member is to be moved, a continuously driven shaft, means operably connected with said shaft for driving the same, a clutch releasably connecting said shaft with said cam, and means actuated by said projections respectively operable to release said clutch and arrest the movement of said cam upon said member being moved to a position corresponding to the actuating projection.

5. In a clutch control mechanism for moving a rotatable member axially in a step by step manner, a cam, a series of projections spaced about said cam, each projection corresponding to a predetermined position to which said member is to be moved, a continuously driven shaft, means operably connected with said shaft for driving the same, a clutch releasably connecting said shaft with said cam, a reciprocating clutch control bar, means operable to move said bar in one direction to render said clutch effective to drive said cam, and means actuated by said projections respectively operable to move said bar in the other direction and render said clutch ineffective, whereby the movement of said cam will be arrested with said member in a position corresponding to the actuating projection.

6. In a clutch control mechanism for moving a rotatable member axially in a step by step manner, a cam, a series of projections spaced about said cam, each projection corresponding to a predetermined position to which said member is to be moved, a continuously driven shaft, means operably connected with said shaft for driving the same, a clutch releasably connecting said shaft with said cam, a reciprocating clutch control bar, means operable to move said bar in one direction to render said clutch effective to drive said cam, means normally actuated by said projections respectively operable to move said bar for rendering said clutch ineffective whereby the movement of said cam will be arrested upon said member reaching a position corresponding to said projection, and manually controlled means operable to render said projection actuated means ineffective to move said bar intermediate one complete cycle of said cam, whereby said member will be returned to a predetermined position by said cam irrespective of the position of said projections thereon.

7. In a clutch control mechanism, a pair of spaced clutch members each including a driving element and a driven element, a drive shaft connected with said driving element, a countershaft connected with said driven element, one of said elements being mounted for oscillatory movement relative to the other element for engagement and disengagement therewith, an offset cam on each of said oscillating elements of the respective clutch members, and a reciprocating clutch bar positioned for engagement by said cams upon rotation of said driving shaft, said bar being provided with a notch in said edge adjacent each clutch member movable by reciprocation of said bar to and from alignment with their adjacent cams, whereby upon said bar being moved to one position one portion of said cam will strike said bar to move it to declutch said elements and when moved to another position said cam will strike said bar to clutch said elements.

8. In a clutch control mechanism, a pair of spaced clutch members each comprising a driving element and a driven element, a driving shaft in driving connection with one of said elements, a driven member in driving connection with the other element, latching means provided on each of said elements, means for swivally mounting one of said elements relative to the other for movement in and out of latching engagement therewith, oppositely disposed projections on each of said swivally mounted elements, said projections being offset relative to each other, a reciprocating clutch bar slidably mounted with its edge extending adjacent said clutch members arranged for engagement by one or the other of said projections, said bar being provided with a notch opposite each of said clutch members so arranged in respect to said projections that upon alignment with one of said projections its associated offset projection will strike said bar to oscillate its element into clutching position, and when aligned with the other of said projections will be engaged by its associated offset projection for oscillating said element to declutching position.

THEODORE M. WRIGHT.